(12) United States Patent
Bell et al.

(10) Patent No.: US 9,782,309 B2
(45) Date of Patent: Oct. 10, 2017

(54) PERSONAL MOBILITY VEHICLE RESTRAINT

(71) Applicant: Key Safety Systems, Inc., Sterling Heights, MI (US)

(72) Inventors: John Bell, Carlisle (GB); Robert Byers, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 408 days.

(21) Appl. No.: 14/571,816

(22) Filed: Dec. 16, 2014

(65) Prior Publication Data

US 2015/0097363 A1   Apr. 9, 2015

Related U.S. Application Data

(63) Continuation-in-part of application No. 13/833,147, filed on Mar. 15, 2013, now abandoned.

(51) Int. Cl.
| | |
|---|---|
| *B60P 7/08* | (2006.01) |
| *A61G 3/08* | (2006.01) |
| *B60P 3/079* | (2006.01) |
| *A61G 5/10* | (2006.01) |

(52) U.S. Cl.
CPC ............ *A61G 3/0808* (2013.01); *B60P 3/079* (2013.01); *A61G 5/1029* (2013.01)

(58) Field of Classification Search
CPC ...... A61G 3/0808; A61G 5/1029; B60P 3/079

USPC .......... 410/4, 7, 8, 11, 12, 18, 23, 100, 103; 248/499, 503.1; 296/65.04; 280/304.1; 297/DIG. 4

See application file for complete search history.

(56) References Cited

U.S. PATENT DOCUMENTS

| | | | |
|---|---|---|---|
| 4,597,544 A | 7/1986 | Fohl | |
| 4,995,775 A * | 2/1991 | Gresham | ............ A61G 3/0808 |
| | | | 410/10 |
| 6,575,677 B2 | 6/2003 | Craft | |
| 2005/0214088 A1 * | 9/2005 | Acton | ................. A61G 3/0808 |
| | | | 410/3 |

FOREIGN PATENT DOCUMENTS

EP         0883530         12/1998

* cited by examiner

*Primary Examiner* — Stephen Gordon
(74) *Attorney, Agent, or Firm* — Markell Seitzman

(57) ABSTRACT

A safety restraint adapted for securing a personal mobility vehicle in a transport vehicle, against movement in a direction opposite to the direction of normal motion of the transport vehicle, the safety restraint comprising: a retractor comprising a spool on which an elongate piece of material is wound; the elongate material being configured to be attached at one end to the personal mobility vehicle; a slider bar adapted to be fixed to the transport vehicle; and wherein the retractor is mounted on the slider bar, in a manner which allows the retractor to slide in the direction of normal motion of the transport vehicle, and prevents the retractor moving in the opposite direction on the slider bar.

8 Claims, 8 Drawing Sheets

FIG. 1

PRIOR ART

PERSONAL MOBILITY VEHICLE RESTRAINT

This patent application is a continuation in part and claims priority of U.S. Ser. No. 13/833,147, filed Mar. 15, 2013. The present invention relates to safety restraints for personal mobility vehicles.

FIELD OF THE INVENTION

Background

A mobility impaired person usually prefers to travel seated in his or her own personal mobility vehicle (PMV) such as a wheelchair, when travelling in a transport vehicle such as a specially adapted car, van or coach. This is usually more comfortable for the occupant and is easier and faster than moving the person into a fixed seat within the transport vehicle. There is also less likelihood of causing injuries to the occupant if he or she can stay in their own chair. However transporting a wheelchair or the like and its occupant presents particular safety problems.

One option is to position the personal mobility vehicle in a backward facing manner so that it is braced against a bulkhead or load absorbing pillar.

However this entails the mobility impaired person facing backwards throughout the journey which is generally unsatisfactory from a social point of view and can make some people nauseous. In any case this arrangement is not satisfactory from a safety point of view if there is a side or oblique impact on the transport vehicle. In those instances the momentum of the personal mobility vehicle will generally be sufficient to overcome the frictional hold of its brakes and it can slew to the side and will be vulnerable to tipping over. This arrangement also provides no protection from an impact from behind.

Normal three point seat belt restraints are generally not adapted to accommodate the extra amount of seat belt webbing which is required to extend all the way round a person and the personal mobility vehicle, nor to work safely with the additional weight of the mobility vehicle.

In any case they can provide little protection against the front wheels lifting or skewing to the side.

Thus, to provide some separate additional restraint for the personal vehicle itself, the front of the personal mobility vehicle is often attached to a separate fixing point, also fixed to a load bearing part of the transport vehicle. This provides resistance to the mobility vehicle skewing or the front lifting up. This may be done using a fixed length of material such as seat belt webbing, but more advantageously an industry standard retractor is used so that the length of webbing is more easily adjustable depending on the size and type of mobility vehicle to be restrained. Usually an automatic locking type of retractor, known as an ALR retractor, is used. However these retractors are not or have not been designed for this task and have some shortcomings.

There is a need for a better adapted, more efficient manner of restraining mobility impaired persons and their personal mobility vehicles in transport vehicles, in a manner which is comfortable, safe and which does not restrict their choice of travelling positions.

SUMMARY OF THE INVENTION

According to one aspect of the invention there is provided a safety restraint adapted for securing a personal mobility vehicle in a transport vehicle, against movement of the personal mobility vehicle in a direction opposite to the direction of normal motion of the transport vehicle, the safety restraint having a retractor comprising a spool on which an elongate piece of material is wound; the elongate material being configured to be attached at one end to the personal mobility vehicle; a slider bar adapted to be fixed to the transport vehicle; and wherein the retractor is mounted on the slider bar, in a manner which allows the retractor to slide in the direction of normal motion of the transport vehicle, and prevents the retractor moving in the opposite direction on the slider bar.

According to a second aspect of the invention there is provided a load limiter is connected in the load path between the occupant and the personal mobility vehicle or the personal mobility vehicle and the transport vehicle. In addition it can be advantageous to include a load limiter in the load path between the occupant and the personal mobility vehicle and/or between the mobility vehicle and the transport vehicle.

According to a third aspect of the invention there is provided a web sensor member comprising an inertia member is mounted for rotation coaxially with the spool so as to rotate with the spool under normal usage and to lock the spool against rotation when the inertia member lags the spool.

The safety restraint further has a mount by which the retractor 12 is mounted on the slider bar. Preferably, the mount has at least one hole which is provided to mount the retractor on the slider bar. This may be a U shaped member adapted to engage the slider bar so the mount can slide on the slider bar. The slider bar may have notches shaped to resist movement of the mount in said opposite direction.

The elongate material may be attached to the personal mobility vehicle by a clip or a hook or other suitable device which is preferably easy and quick to attach and detach.

In another embodiment, a safety restraint adapted for securing a personal mobility vehicle (1) in a transport vehicle (3), against movement of the personal mobility vehicle in a direction opposite to the direction (17) of normal motion of the transport vehicle, the safety restraint has a spool and a locking mechanism. The spool holds a length of material (10) for fastening to the personal mobility vehicle. The spool is rotatably mounted in a retractor (12) and is biased to wind in loose material. The locking mechanism is operatively associated with the spool and adapted to lock the spool against rotation in a direction to pay out webbing but to allow retraction in a direction to wind in the material onto the spool. The safety restraint may include a web sensor member (52) having an inertia member mounted for rotation coaxially with the spool so as to rotate with the spool under normal usage and to lock the spool against rotation when the inertia member lags the spool. The locking mechanism may have a toothed disc (52) adapted to be engaged by a pawl (50) to lock the spool against rotation in a crash. The locking mechanism may have the teeth formed in a housing for the spool, with which the spool engages to lock against rotation.

In yet another embodiment, a safety restraint adapted for securing a personal mobility vehicle (1) in a transport vehicle (3), against movement of the personal mobility vehicle in a direction opposite to the direction of normal motion (17) of the transport vehicle. The safety restraint has a retractor and a slider bar. The retractor (12) on which an elongate piece of material (10) is wound; the elongate material comprising means for attachment of one end to the personal mobility vehicle. The retractor has a locking mechanism comprising a web sensor member (52) for causing the retractor to lock when the elongate member is withdrawn at a velocity above a predetermined velocity, the locking mechanism comprising an inertia member mounted for rotation coaxially with the spool so as to rotate with the spool under normal usage and to lock the spool against rotation when the inertia member lags the spool. The slider bar (20) is adapted to be fixed to the transport vehicle. The retractor is mounted on the slider bar, in a manner which allows the retractor to slide in the direction of normal motion of the transport vehicle, and prevents the retractor moving in the opposite direction on the slider bar.

The safety restraint may have a mount (21) by which the retractor (12) is mounted on the slider bar (20). The mount (21) has a U shaped member (21) adapted to slide on the slider bar (20). The slider bar (20) is formed with notches (7A) shaped to resist movement of the mount in said opposite direction. A hook for attachment of the elongate material to the personal mobility vehicle (1) may be provided as well as a clip for attachment of the elongate material to the personal mobility vehicle (1). The locking mechanism may have a toothed disc (52) adapted to be engaged by a pawl (50) to lock the spool against rotation in a crash. The teeth can be formed in a housing for the spool, with which the spool engages to lock against rotation.

BRIEF DESCRIPTION OF THE DRAWINGS

For a better understanding of the invention and to show how it may be carried into effect, reference will now be made to the accompanying drawings, in which.

DETAILED DESCRIPTION OF THE DRAWINGS

Figure 1:
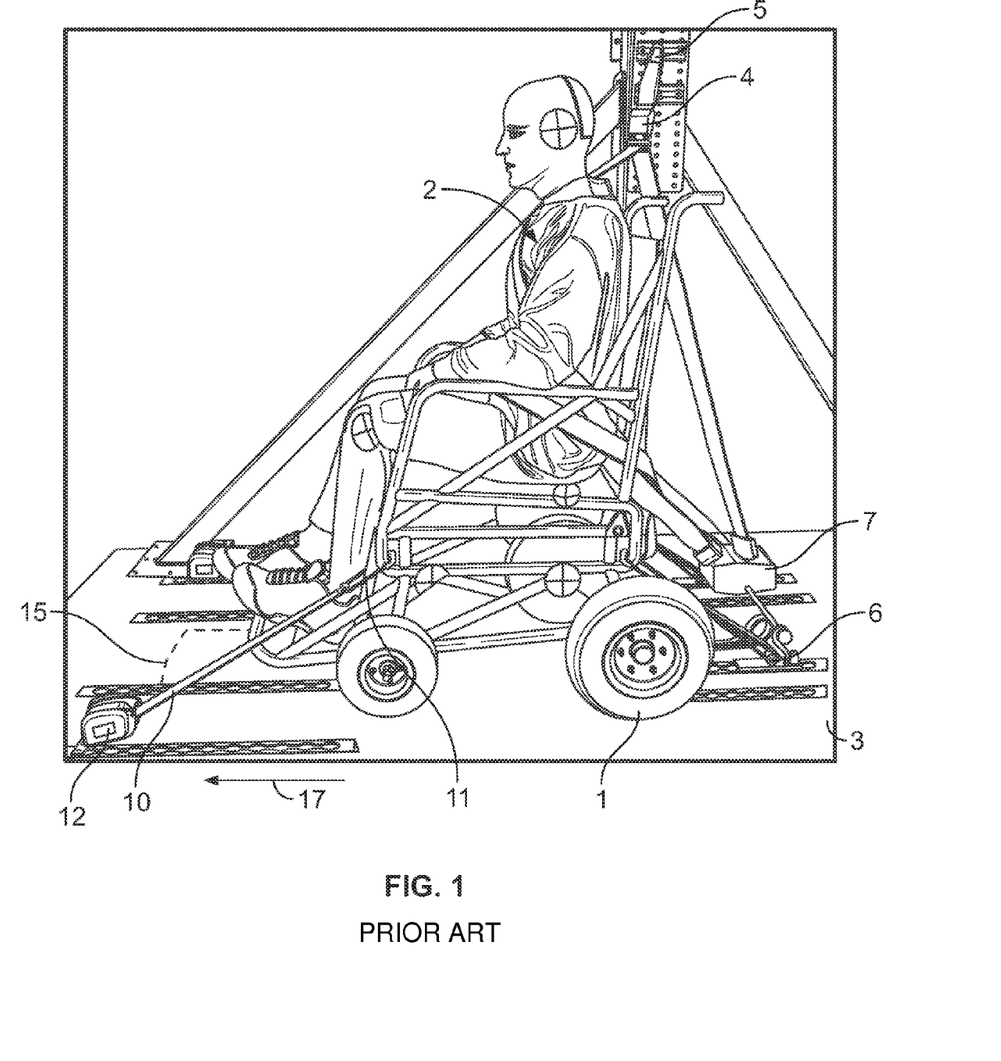
FIG. 1 illustrates a traditional safety restraint for a personal mobility vehicle.

FIG. 1 illustrates a known way of restraining a personal mobility vehicle 1 and its occupant 2 in a transport vehicle. FIG. 1 shows the mobility vehicle 1 attached to a test sled 3 for illustrative purposes. In practice the sled 3 would be a transport vehicle such as an adapted car or a van, bus or coach.

A three point safety restraint 4 traditionally has a shoulder level connection via D-ring or other type of anchor to a load bearing bulkhead 5 such as a pillar of the vehicle frame, and at floor level to another load bearing part 6. Safety belt webbing passes from the D-ring diagonally across the occupant's torso and horizontally across his lap and is fastened by a tongue fitting into a buckle 7 at the side of the mobility vehicle 1. A retractor is usually located at floor level to keep the webbing taut across the occupant. The belt can be replaced by another form of connecting member such as a wire or rope or the like.

The front of the mobility vehicle 1 is attached to a second length of seat belt webbing 10 via a hook 11 (which may alternatively be a clip or other suitable fastening). The webbing 10 is wound on an automatic locking retractor 12 which is fixed to a load bearing part of the floor of the transport vehicle by a suitable fixing device such as a bolt passing through a hole 13.

This arrangement allows the occupant to travel relatively safely facing forward. However it has some disadvantages as will be explained below.

Figure 2:
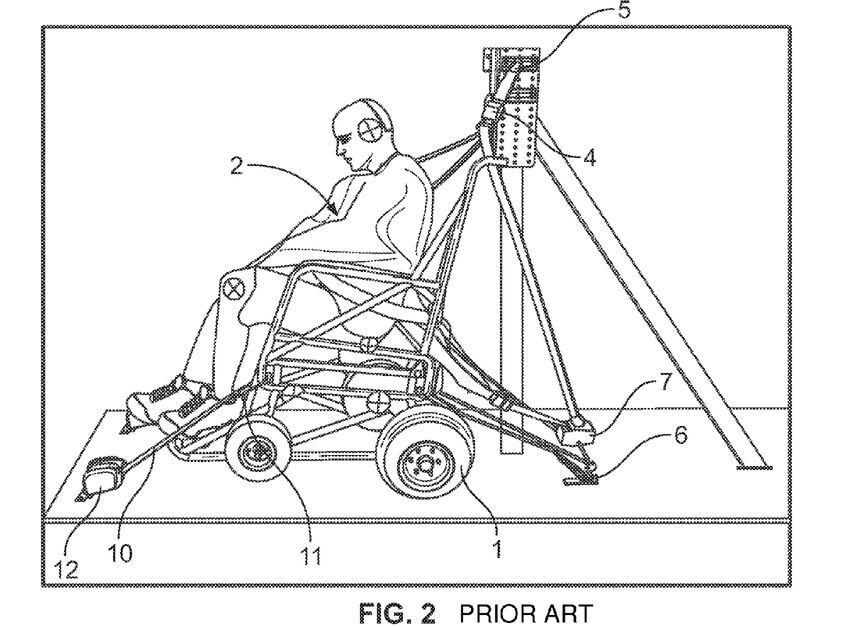
FIGS. 2 to 6 illustrate the sequence of events during a crash with the traditional safety restraint of FIG. 1.
Figure 3:
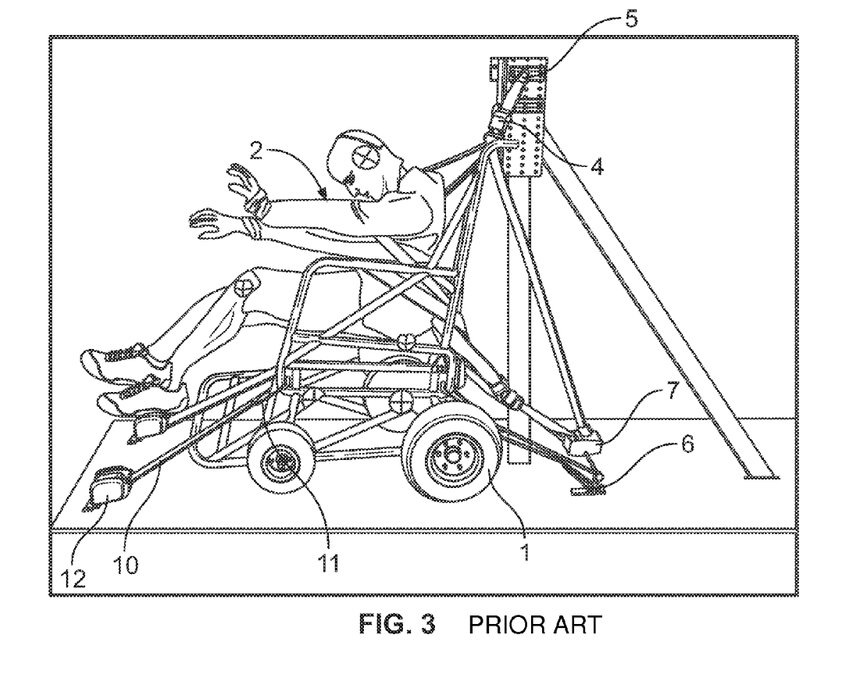
Figure 4:
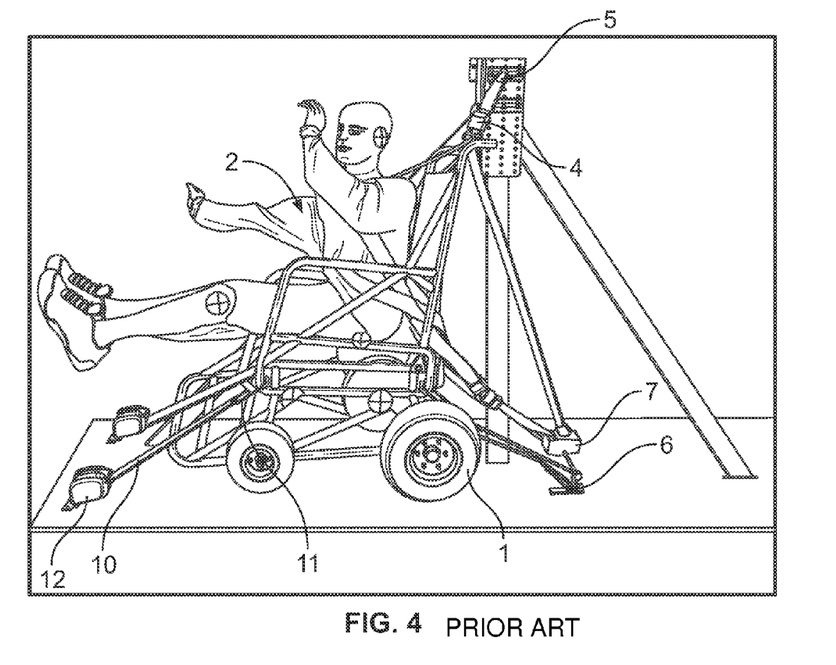
Figure 5:
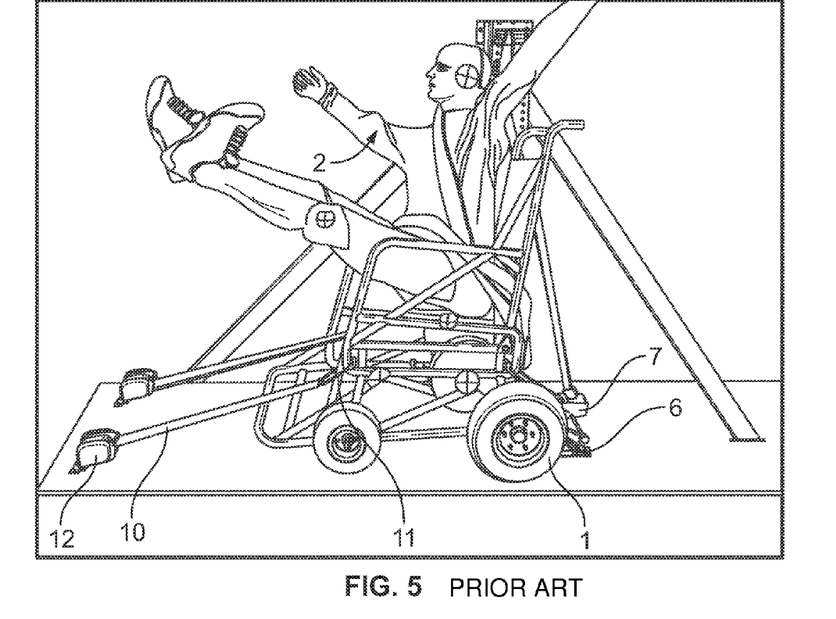
Figure 6:
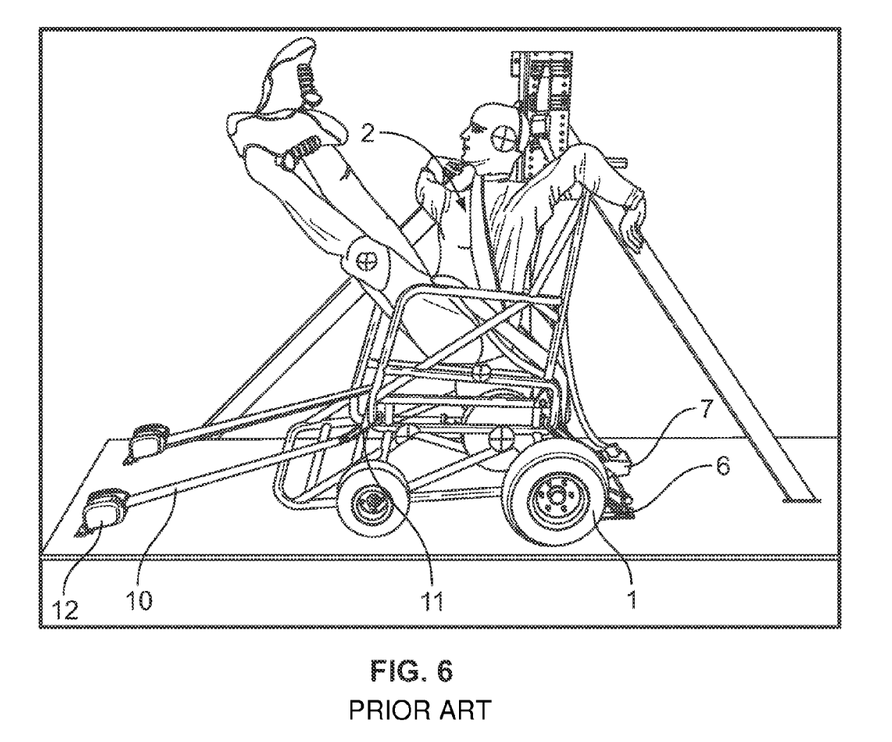

The momentum of the personal mobility vehicle 1 in the forward direction carries it with the occupant 2 a short distance forward in the direction of arrow 17 compared to the transport vehicle as shown by broken line 15 in FIG. 1. This creates slack in the webbing 10 restraining the front of the mobility vehicle, which allows the mobility vehicle 1 to rebound in the backward direction as the crash pulse dissipates. This sequence is illustrated in FIGS. 2 to 6 when a sudden deceleration of the transport vehicle occurs, for example in the event of a crash. FIG. 2 is approximately 0.08 seconds after a crash event and the personal mobility vehicle 1 with the occupant 2 are moving in a forward direction relative to the transport vehicle. In FIG. 3, typically at about 0.11 seconds, the mobility vehicle and its occupant have moved further forward to about the maximum. FIGS. 4 to 6 show the rebound in which the mobility vehicle and occupant move backward relative to the transport vehicle. As can be seen in FIG. 6 this rebound is very uncomfortable for the occupant and could be dangerous. In severe cases the front wheels of the mobility vehicle are likely to lift off the floor of the transport vehicle, which makes for an even more unstable and dangerous situation.

Figure 7:
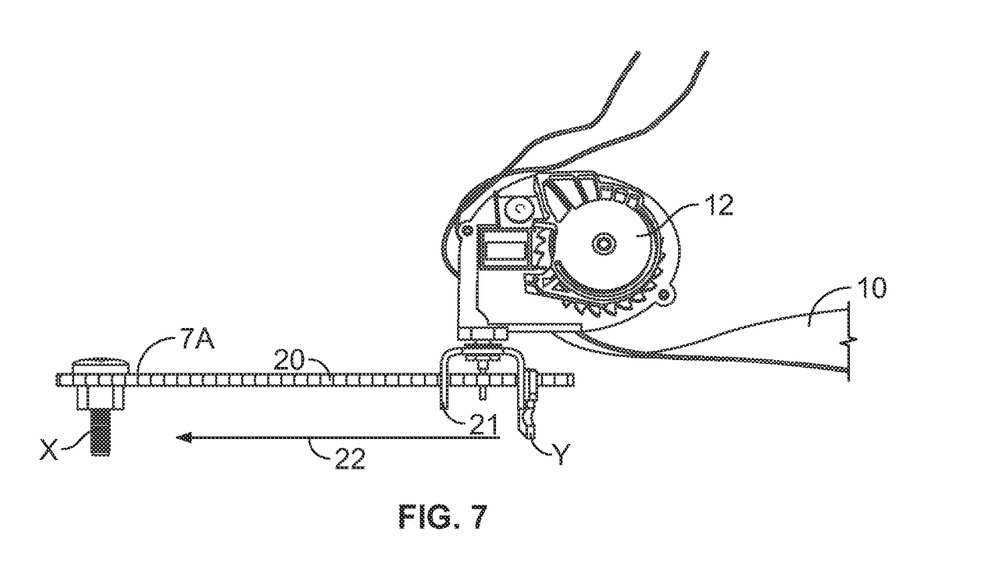
FIG. 7 illustrates a safety restraint according to a first aspect of the invention.
Figure 8:
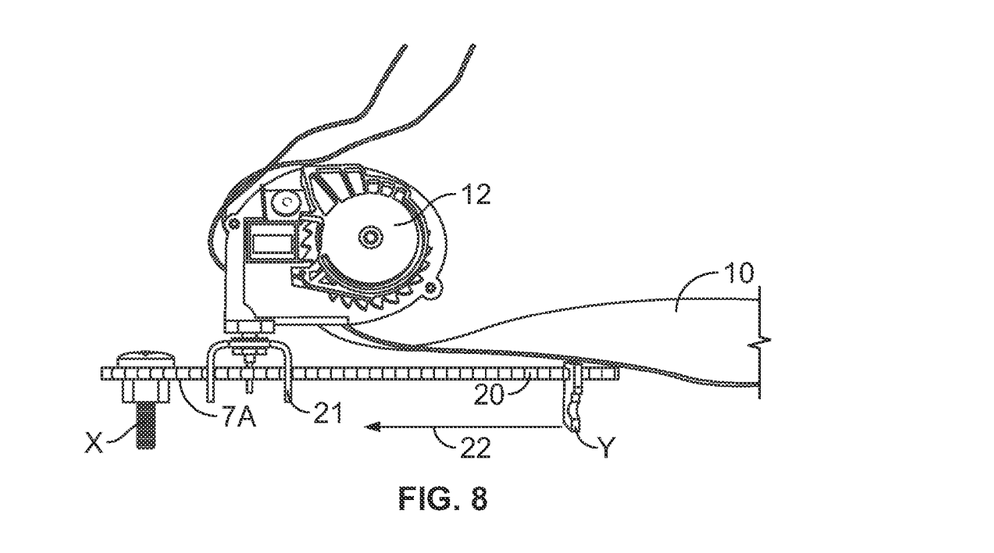
FIG. 8 illustrates the restraint of FIG. 7 in another position.

One aspect of the present invention can reduce the extent of the rebound and thus make securement of the mobility vehicle more robust and reliable. This is accomplished by arranging the retractor to be slidable along a slider bar. The slider bar is fixed to the transport vehicle. The arrangement is adapted so that it is relatively easy for the retractor to slide in one direction, the direction of motion, and relatively hard for it to slide in the opposite direction. As shown in FIGS. 7 and 8 the retractor may be fixed to a slidable mount 21 having a hole through which the slider bar 20 fits, and the slider bar 20 may be notched to resist reverse sliding.

As shown in FIGS. 7 and 8, the retractor 12 on which seat belt webbing 10 is wound, may be mounted on a metal mount 21 formed as a U shaped yolk having a middle saddle section and two side arms with the retractor mounted on the saddle section. Two aligned holes are set in the side arms and a slider bar 20 fits through the two holes which are sized so that the metal mount 21 and retractor 12 slide relatively easily in the direction of arrow 22, which is arranged to be the forward direction of transport parallel to arrow 14. The slider bar 20 is notched as shown so as to resist movement of the mount 21 in the reverse direction, opposite that of arrow 22, i.e. the backward direction of transport. In the example shown in FIGS. 7 and 8 the bar 20 has notches 7A and is elevated from the floor by shoulder bolt X and rear leg Y. Alternatively the mount can be integral with the frame of the retractor 12 which could for example incorporate one or more holes through which the slider bar fits.

Thus in the event of a crash, the transport vehicle decelerates rapidly, but the momentum of the personal mobility vehicle and its occupant causes it to continue to move forward and create slack in the webbing 10. At the same time the momentum of the retractor causes it to slide along the slider bar 20 in the direction of the arrow 22 and thus to take up the slack caused by relative forward movement of the personal vehicle. At the peak of a crash pulse the retractor 12 has moved forward as shown in FIG. 8 and absorbed the slack created by the personal mobility vehicle 1 moving forward. Hence the personal mobility vehicle is still securely restrained at the front, and the front restraint resists reverse movement during the rebound part of the crash pulse. The result is a more comfortable and safer experience for the occupant.

It is also advantageous to incorporate load limiting devices into either or both of the rear wheel chair restraint 6 and the occupant restraint 7 to help absorb crash energy to improve the effect on rebound and limit the load applied to the front wheel chair restraints 12 on rebound.

Figure 9A:
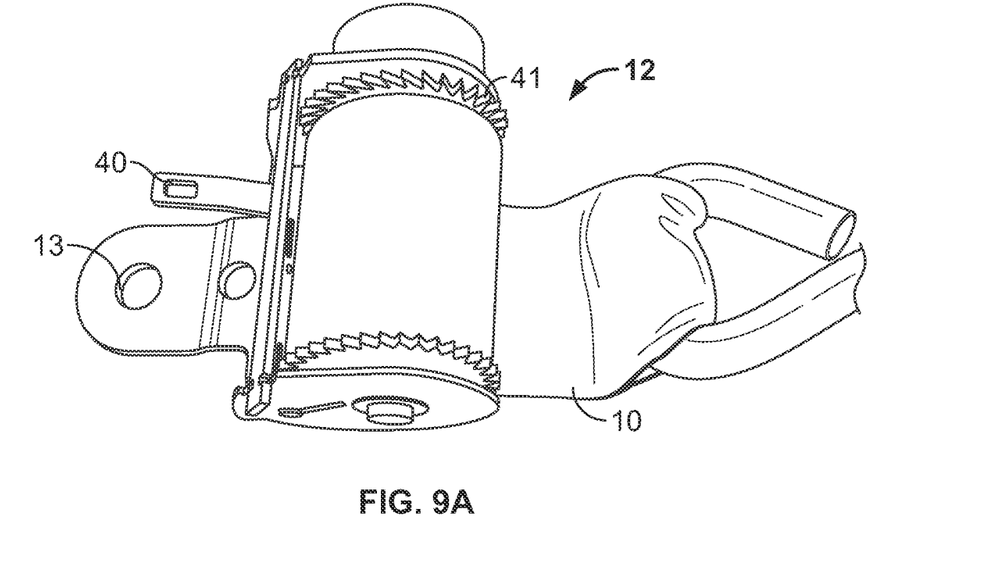
FIGS. 9A and 9B illustrate a standard ALR retractor traditionally used to restrain mobility vehicles.
Figure 9B:
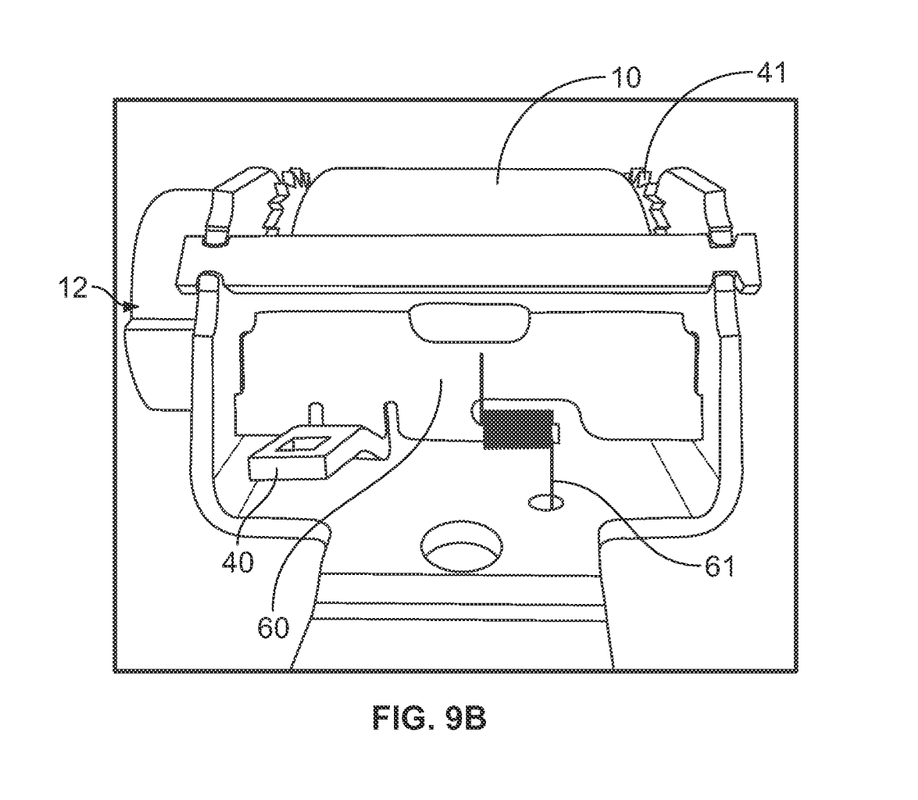

The retractor 12 generally used to restrain front wheels in this type of restraint is usually a standard form of automatic locking (ALR) retractor as shown in FIGS. 9A and 9B. This locks the spool against rotation by having a lock plate 60 extending across the width of the spool to engage toothed discs 41 on both sides of the spool. This is a reliable and strong retractor but in this application, because it is mounted in a reverse configuration to normal, the lock plate can be thrown out of engagement on impact because the geometry is not adapted for front wheel chair restraints.

To resist this malfunction it is known to incorporate a strong spring 61 to ensure good engagement of the lock plate 60 with the toothed discs 41 and thus assist robust locking. However this tends to prevent retraction of the webbing unless the plate is manually released for example by a release lever 40.

Also this design has a limit on the length of webbing 10 that can be stowed on the spool because the lock plate 60 extends right across the spool and if there is too much webbing it will catch on the lock plate 60 and cause a malfunction. This traditionally restricts the reach of the restraint.

Figure 10:
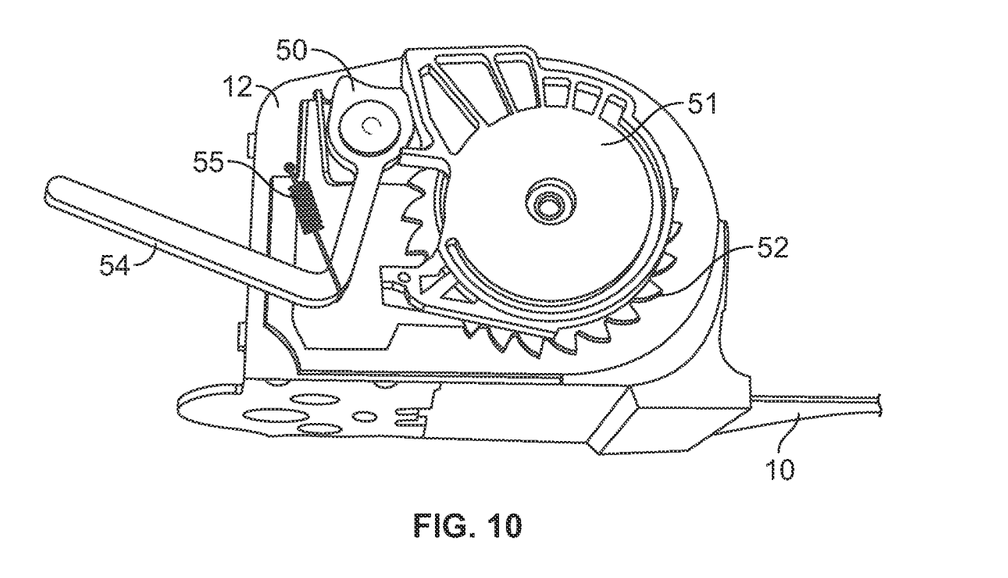
FIGS. 10 to 12 illustrate a modified retractor according to a second aspect of the invention.
Figure 11:
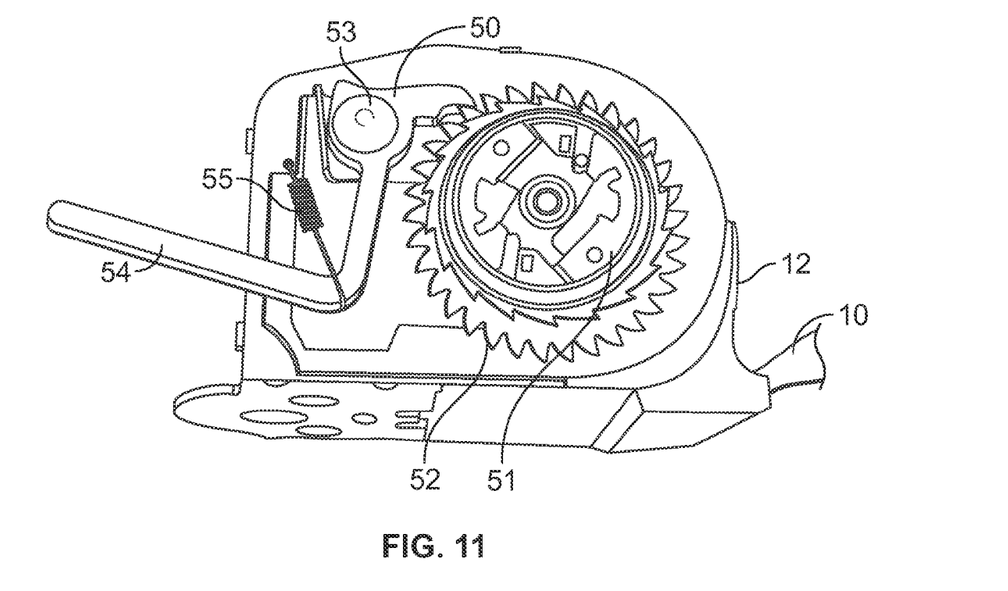
Figure 12:
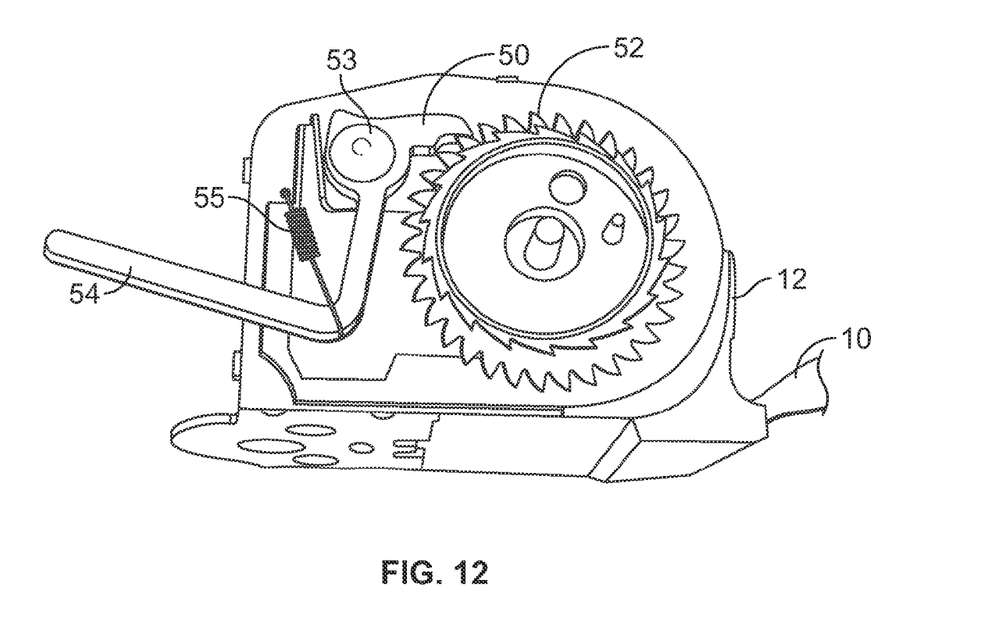

To address this problem a second aspect of the invention uses a design of retractor which does not rely on a lock plate. This may be a specifically modified version of the S20 ALR retractor manufactured and sold by the applicant. In this retractor, as illustrated in FIGS. 10 to 12, a locking pawl 50 is located on one side of the retractor and is used to lock the spool instead of a lock plate.

In its locking configuration the pawl 50 engages a toothed disc 52 fixed to the spool upon which webbing 10 is wound. It is pivoted at pivot 53 and integral with a manual release lever 54 which can be used to override the locking mechanism when operated against the bias of spring 55.

The pawl 50 moves under the influence of a modified lock cup 51 which has a webbing sensor mechanism 52 in which an inertial disc rotates with the spool and locks the spool if there is a rapid withdrawal of webbing indicating a crash situation. An example of such a webbing sensor is shown in U.S. Pat. No. 4,597,544 and a modified version in EP 0 883 530.

The invention claimed is:

1. A safety restraint adapted for securing a personal mobility vehicle (1) in a transport vehicle (3), against movement of the personal mobility vehicle in a direction opposite to a direction of normal motion (17) of the transport vehicle, the safety restraint comprising:
   a retractor (12) on which an elongate piece of material (10) is wound;
   the elongate material comprising means for attachment of one end to the personal mobility vehicle;
   a slider bar (20) adapted to be fixed to the transport vehicle;
   wherein the retractor is mounted on the slider bar, in a manner which allows the retractor to slide in the direction of normal motion of the transport vehicle, and prevents the retractor moving in an opposite direction on the slider bar; and
   the retractor comprises:
   a locking mechanism comprising a web sensor member (52) for causing the retractor to lock when the elongate piece of material is withdrawn at a velocity above a predetermined velocity, the locking mechanism comprising an inertia member mounted for rotation coaxially with a spool so as to rotate with the spool under normal usage and to lock the spool against rotation when the inertia member lags the spool.

2. A safety restraint according to claim 1 further comprising a mount (21) by which the retractor (12) is mounted on the slider bar (20).

3. A safety restraint according to claim 2 wherein the mount (21) comprises a U shaped member (21) adapted to slide on the slider bar (20).

4. A safety restraint according to claim 2 wherein the slider bar (20) is formed with notches (7A) shaped to resist movement of the mount in said opposite direction.

5. A safety restraint according to claim 1 further wherein the means for attachment comprises a hook for attachment of the elongate piece of material to the personal mobility vehicle (1).

6. A safety restraint according to claim 1 further wherein the means for attachment comprises a clip for attachment of the elongate piece of material to the personal mobility vehicle (1).

7. A safety restraint according to claim 1 wherein the locking mechanism comprises a toothed disc (52) adapted to be engaged by a pawl (50) to lock the spool against rotation in a crash.

8. A safety restraint according to claim 1 wherein the locking mechanism comprises teeth formed in a housing for the spool, with which the spool engages to lock against rotation.

* * * * *